(12) United States Patent
Garber et al.

(10) Patent No.: US 11,641,140 B2
(45) Date of Patent: May 2, 2023

(54) ELECTROMECHANICAL BATTERY

(71) Applicant: Spinlectrix, Inc., Burlingame, CA (US)

(72) Inventors: Jonathan Forrest Garber, Hillsborough, CA (US); Frank Levinson, Tiburon, CA (US); Andre Adams, Tiburon, CA (US)

(73) Assignee: SPINLECTRIX, INC., Burlingame, CA (US)

( * ) Notice: Subject to any disclaimer, the term of this patent is extended or adjusted under 35 U.S.C. 154(b) by 153 days.

(21) Appl. No.: 17/257,284

(22) PCT Filed: Jul. 1, 2019

(86) PCT No.: PCT/US2019/040186
§ 371 (c)(1),
(2) Date: Dec. 30, 2020

(87) PCT Pub. No.: WO2020/010017
PCT Pub. Date: Jan. 9, 2020

(65) Prior Publication Data
US 2021/0296961 A1 Sep. 23, 2021

Related U.S. Application Data

(60) Provisional application No. 62/694,853, filed on Jul. 6, 2018.

(51) Int. Cl.
*H02K 7/02* (2006.01)
*H02K 11/22* (2016.01)
(Continued)

(52) U.S. Cl.
CPC ............... *H02K 7/025* (2013.01); *F03G 3/08* (2013.01); *H02K 5/10* (2013.01); *H02K 11/0141* (2020.08); *H02K 11/22* (2016.01)

(58) Field of Classification Search
CPC ...... H02K 7/025; H02K 5/10; H02K 11/0141; H02K 11/22; H02K 1/2792; H02K 11/21;
(Continued)

(56) References Cited

U.S. PATENT DOCUMENTS

| | | |
|---|---|---|
| 5,398,571 A | 3/1995 | Lewis |
| 5,705,902 A * | 1/1998 | Merritt ................ H02K 1/2786 |
| | | 310/156.43 |

(Continued)

FOREIGN PATENT DOCUMENTS

| | | |
|---|---|---|
| JP | 2003088040 A | 3/2003 |
| JP | 2004232738 A | 8/2004 |

(Continued)

OTHER PUBLICATIONS

Wikiwand-halbach array (Year: 2015).*
(Continued)

*Primary Examiner* — Ahmed Elnakib
(74) *Attorney, Agent, or Firm* — Squire Patton Boggs (US) LLP

(57) ABSTRACT

The present invention relates to an electromechanical battery comprising a single pole-pair Halbach array of permanent magnets incorporated into an annular flywheel, which together comprise a rotor assembly, a means for levitating the rotor assembly using a "double-lift" attractive magnetic levitator under active control, and a means for actively stabilizing the spinning rotor assembly by interaction with the fringe fields of the Halbach array.

18 Claims, 11 Drawing Sheets

(51) Int. Cl.
  *H02K 11/01* (2016.01)
  *F03G 3/08* (2006.01)
  *H02K 5/10* (2006.01)
(58) Field of Classification Search
  CPC .......... H02K 7/09; H02K 1/2793; F03G 3/08; Y02E 60/16
  USPC .................................................. 310/73, 90.5
  See application file for complete search history.

(56) References Cited

U.S. PATENT DOCUMENTS

| | | | |
|---|---|---|---|
| 6,566,775 | B1 | 5/2003 | Fradella |
| 6,858,962 | B2 | 2/2005 | Post |
| 7,679,247 | B2 | 3/2010 | Wang |
| 7,876,010 | B2 | 1/2011 | Post |
| 8,242,649 | B2 | 8/2012 | Fradella |
| 2001/0036565 | A1 | 11/2001 | Jennings |
| 2008/0061560 | A1 | 3/2008 | Peacock |
| 2012/0098370 | A1* | 4/2012 | Pinneo ............... F16F 15/305 310/90.5 |
| 2012/0098371 | A1* | 4/2012 | Pinneo ............... F16C 32/0442 310/90.5 |
| 2013/0207496 | A1* | 8/2013 | Garber ............... F16C 32/0459 310/90.5 |
| 2013/0229078 | A1* | 9/2013 | Garber ............... H02K 7/025 310/90.5 |
| 2013/0261001 | A1 | 10/2013 | Hull et al. |
| 2016/0056759 | A1 | 2/2016 | Pinneo et al. |
| 2017/0271943 | A1 | 9/2017 | Groves et al. |
| 2017/0343043 | A1* | 11/2017 | Walsh ................. F16C 32/0425 |

FOREIGN PATENT DOCUMENTS

| | | |
|---|---|---|
| JP | 2008537872 A | 9/2008 |
| JP | 2011-112068 A | 6/2011 |
| WO | WO 2017212244 A1 | 12/2017 |

OTHER PUBLICATIONS

Notice of Reasons for Rejection dated Mar. 1, 2022 for Japanese Patent Application No. 2020-573509, with English translation, 7 pages.

International Search Report and Written Opinion for International Application PCT/US2019/040186, Search Report dated Oct. 24, 2019, 10 pages.

Merritt, Bernard T, RF Post, Gary R Dreifeurst, and DA Bender. "Halbach Array Motor/Generators—A Novel Generalized Electric Machine." *Halbach Festschrift Symposium*, Feb. 3, 1995.

Shafai, Beale, S Beale, P LaRocca, and E Cusson. "Magnetic Bearing Control Systems and Adaptive Forced Balancing." *Control Systems, IEEE* 14, No. 2 (1994): 4-13.

EPO Communication dated Feb. 15, 2022 forwarding the extended European Search Report for European Patent Application No. 19830487.5, 8 pages.

\* cited by examiner

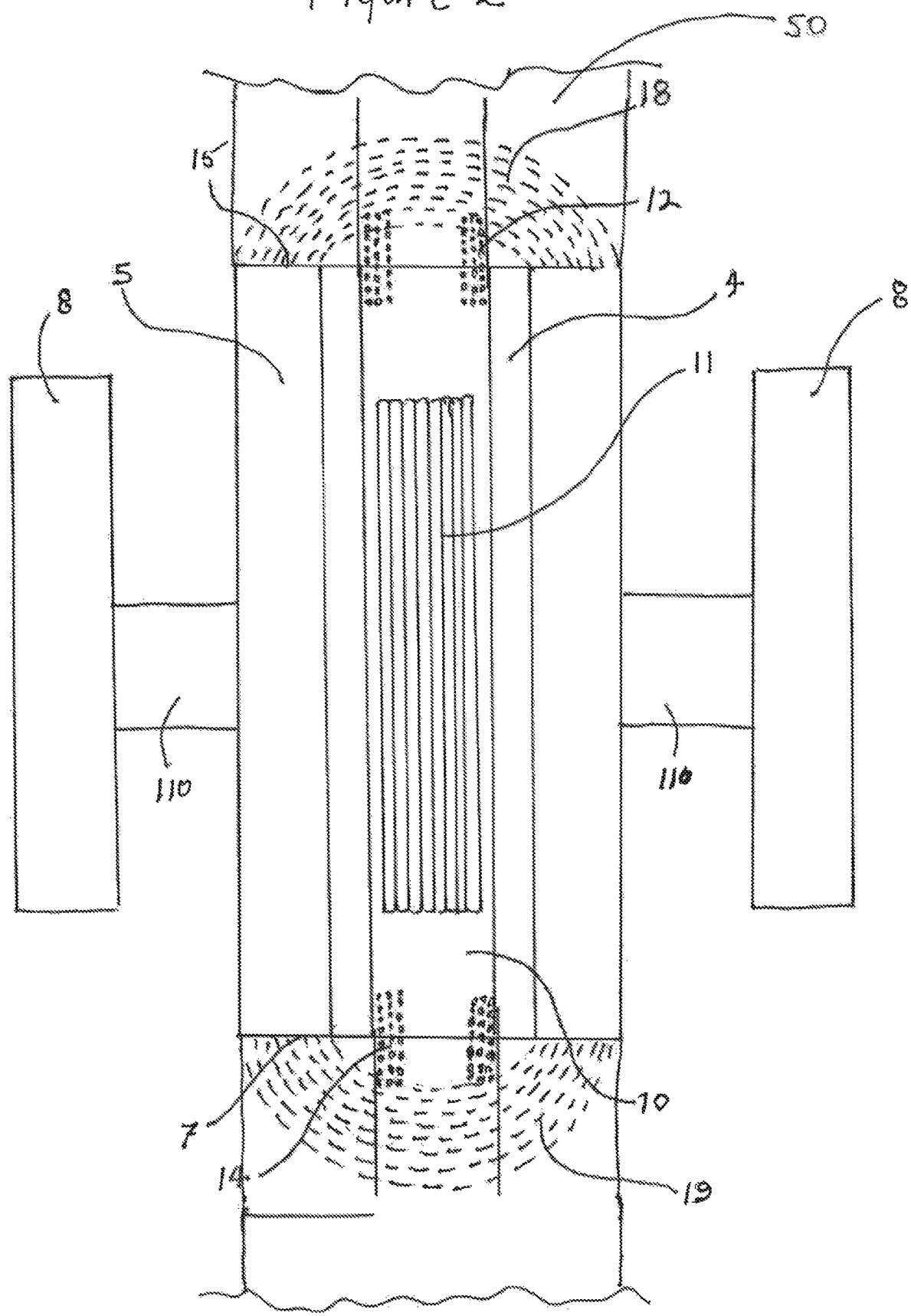

ELECTROMECHANICAL BATTERY

RELATED APPLICATIONS

This application is a National Stage application under 35 U.S.C. § 371 of International Patent Application No. PCT/US2019/040186, filed Jul. 1, 2019, which claims the benefit of and priority to U.S. Provisional Patent Application Ser. No. 62/694,853 filed Jul. 6, 2018, both applications are incorporated, fully herein by reference in their entirety for all purposes.

FIELD OF THE INVENTION

This invention relates to a device and method for the storage of electrical energy in the form of kinetic energy—the mechanical energy of motion.

INTRODUCTION

The general trend away from the use of fossil fuels for the generation of electrical energy has taken many paths. Significant renewable energy sources like solar, wind and tidal power provide energy intermittently, temporally decoupled from energy demand. One approach to mitigating this has been the development of batteries to facilitate the storage of intermittent energy sources.

Electrochemical electrical energy storage has limitations: Of prime concern is the life cycle and cost of such batteries. Then, of course, there is the issue of toxic materials used in manufacture. Enter the electromechanical battery, commonly termed an energy-storage flywheel, FES, or simply, a flywheel.

Electromechanical batteries are comprised of substantially inert standard construction materials: permanent magnets, common metals, polymer composites and the like. In one recent design iteration, electromechanical batteries comprise a columnar Halbach array of magnets, a stator centered in the Halbach magnetic field, a flywheel coupled to the Halbach array where the flywheel is put in motion to store energy. To minimize as many sources of frictional resistance as possible, the high-speed rotating parts are placed in an evacuated chamber. An example of a flywheel incorporating a Halbach magnet array may be seen in Merritt, et al., Halbach Array Motor/Generators— A Novel Generalized Electric Machine.

In this configuration, electromechanical batteries can be superior to current electrochemical batteries. For example, power densities of 5-10 kW/kg, several times that of most internal combustion engines and 100 times that of current best electrochemical batteries, can be achieved. And the efficiency of energy recovery can exceed that of typical electrochemical batteries.

Perhaps most interestingly, the life cycle for electromechanical batteries is virtually limitless, with estimates of more than a decade of constant charging/discharging cycles being regularly touted. This enables electromechanical batteries to also be utilized in storage applications that can have very many fast charge/discharge cycles, such as phase and load-matching applications, power leveling, and power conditioning, in addition to providing the aforementioned storage mitigation for intermittent power sources.

Electromechanical batteries are not, however without problems.

One fundamental problem with levitated non-contacting electromechanical batteries is described by Earnshaw's Theorem, which demonstrates that there is no possible static configuration of magnets that by themselves can stably levitate an object against gravity in three dimensions. Many in the prior art have attempted to address this limitation using the dynamic motion of the flywheel to circumvent the limitation of Earnshaw's Theorem in an effort to ensure that the system is passively stable—that is, stable without an intervening active control.

Instead, this invention leverages low-cost modern computation to actively levitate and stabilize the flywheel system using very little power. This novel active stabilizing system substantially avoids the parasitic power drain of current active stabilizing systems, minimizes the sets of permanent magnets required, and in the process, eliminates the need for expensive, finely balanced flywheels.

Even with modern mass-manufacturing techniques, fabricated flywheel rotors typically exhibit imbalances that must be corrected by a post-manufacturing balancing process. Elimination of this process can speed manufacture and reduce costs.

Further, under the stresses generated by high-speed rotation, the real materials comprising the flywheel can strain in a non-ideal manner. As real materials age, such strains can cause the inertial center and axis of the spinning rotor to migrate, and thus create potentially huge imbalance forces. Even small imbalances can induce cyclic fatigue in rotor materials, limiting lifetimes, reducing energy storage capacity, or causing catastrophic failure.

These imbalance forces can be mitigated if the flywheel is allowed to rotate about its inertial axis (as opposed to a fixed geometric axis) even though the inertial axis may vary in position due to changes in stress over time.

Typical magnetic bearings, while contactless, do not inherently eliminate geometric axis imbalance forces, and can be complicated, expensive, and power-hungry. Magnetic suspension may also be a source of radial instability. A flywheel employing passive magnetic bearings, and disclosure of associated rotor instabilities may be seen in U.S. Pat. No. 7,876,010, which is fully incorporated herein by reference, including drawings.

In summary, balance-related phenomena in flywheels ultimately impose expensive precision manufacturing, derating of energy storage capacity, and service life reduction due to material aging effects that must be corrected through maintenance or repair. These serious limitations all derive from the prior art's spinning flywheels about geometrically defined axes rather than inertial rotational axes.

The art has long employed various combinations of Z-axis magnetic levitation configurations, using combinations of active and passive magnets such as an attractive pair above a rotor and a repulsive pair below. None has achieved the simplicity and utility provided by the novel magnetic suspension system of the instant invention.

A further limitation of the flywheel art relates to the need to operate high speed flywheel rotors in a vacuum. Energy storage flywheels operate at very high speeds. The periphery of most such flywheels has a velocity several times the speed of sound in air. When a rotor is operated at high speed in air, energy is lost to aerodynamic friction and shock wave phenomena. The art has long known that energy storage flywheels must operate in a vacuum to avoid such losses.

Maintenance of a vacuum for long periods of time without active means is difficult. Materials of construction such as composite matrix materials can outgas to a degree that rapidly degrades a vacuum environment. It is common in the art to attach active vacuum pumps to mitigate such outgassing. These pumps add cost, scheduled maintenance, and unscheduled downtime to the energy storage flywheel system. Sudden vacuum pump failure can cause catastrophic flywheel failure. In general, they reduce the service lifetime of energy storage flywheels.

Additional vacuum degradation may arise from penetrations through the vacuum barrier, such penetrations being needed for electrical power and signal conductors and heat rejection components. Heat rejection presents a particularly difficult vacuum sealing problem due to thermomechanical changes in seal dimensions under varying heat loads. These thermally induced dimensional changes break metal vacuum seals in extended service. Elastomer seals are commonly used, but these allow diffusion of gases into the vacuum environment, necessitating active vacuum maintenance measures such as pumps.

Rotation of magnets such as the rotor's Halbach array commonly induces electrical currents in conductive components that may be immersed in said rotating fields. This can destabilize a rotor, degrade control system effectiveness, and reduce energy storage efficiency due to energy dissipation as eddy current heating. The instant invention can mitigate this limitation through magnetic shielding using magnetically permeable components.

The foregoing illustrates, without limitation, several serious limitations in the art of energy storage flywheels that are overcome by this invention.

SUMMARY

A flywheel according to the instant invention comprises the following:

at least one rotor assembly that spins substantially about its inertial axis as determined by its mass distribution, thereby obviating a need for precision rotor centration or balance, said critical utility enabled by:

a novel double-lift attractive magnetic levitation system having static radial stability while not imposing rotation about a fixed geometric axis, and a novel control system that employs heretofore unutilized magnetic features of unipolar cylindrical single pole-pair Halbach magnetic arrays to provide rotor translation and/or tilt, as well as eliminating sub-synchronous instabilities through an efficient electronic damping functionality, and further comprises:

optionally, a novel means of thermal transfer whereby heat generated within the flywheel stator assembly is transported to the external environment without penetration of the flywheel's vacuum enclosure, and further comprises;

optionally, magnetically permeable shields that isolate magnetic fields and prevent detrimental interactions of such fields that would otherwise degrade operation of the flywheel, and further comprises;

sensors of rotor position in three mutually orthogonal axes X, Y, and Z, and further comprises;

computational means that accept sensor data, perform control computations, and energize control effectors, and further comprises;

at least one stator with electromagnetic coils disposed such that, in combination with a unipolar cylindrical Halbach magnet array, effects reversible transformation of electrical energy into rotational kinetic energy as well as providing for the disposition of rotor position and stability control effectors, and further comprises;

electronic means of interfacing with the external environment, and further comprises;

an enclosure and mechanical framework that together provide mechanical support, a low-pressure environment, and means for mounting the flywheel assembly to fixed support in the environment external to said enclosure.

These elements of the invention are discussed in more detail below.

Double-lift magnetic levitation system: FIG. 1D schematically depicts without limitation, one potential configuration of an attractive levitator magnet assembly, which is comprised of inner ring magnet 217, outer ring magnet 216, electromagnetic control coil 218, and magnetically permeable component 215, the assembly being positioned perpendicular to the local gravity vector. Arrows indicate opposing magnetic polarity of ring magnets 216 and 217. The assembly attracts magnetically permeable component 219, which is mounted on the rotor assembly (not shown).

In this invention, one such assembly is employed at the upper portion of the rotor, while another is employed at the lower portion of the rotor, substantially about the rotor's inertial center. Importantly, both assemblies lift up on their respective magnetic components fixed to the rotor (not shown). Vertical rotor position is sensed and control coil 218 in at least one assembly is energized to modulate the total lifting force provided by the permanent magnets, to match the rotor's weight, whereupon the rotor is levitated.

During operation, magnetic flux generated by ring magnets 216 and 217 is conducted through magnetically permeable enclosure 215 and returns in free space or in part through magnetic component 219. When energized, electromagnetic control coil 218 modulates flux in the magnetic circuit by changing magnetic saturation of enclosure 215 at the region between ring magnets 216 and 217. This controls the degree of magnetic attraction exerted by the assembly on magnetic rotor component 219. Magnet dimensions, materials and strength are generally selected such that magnets 216 and 217 contribute approximately equal magnetic energy to the magnetic circuit (up magnetic flux equaling down magnetic flux). It will be apparent to those skilled in the art that a suitable magnetic circuit may be achieved with other than two magnets, including, without limitation, only one magnet.

During operation, electromagnetic control coil 218 is energized (in response to Z-axis rotor position sensors and suitable computation, such as a PID control loop) to maintain the rotor in levitation by modulating the assembly's attractive force.

A further aspect of this double lift levitation configuration is a small stabilizing centration force the levitator magnets impart to the rotor.

A novelty of this invention is use of fringing fields to control rotor stability. Fringing fields, as depicted in FIG. 1B, have been regarded in the art as nuisances or useless epiphenomena. The instant invention employs these fields to effect rotor positioning by means of interaction with electromagnetic coils positioned within the fringing fields. The uniform unipolar magnetic field within the central region of the Halbach array cannot be employed to effect rotor displacement perpendicular to the axis of rotation. The array's fringing fields exhibit components that may be acted upon by controllable electromagnets to stabilize the rotor.

Electromagnetic control coils are disposed as in FIG. 2, elements 12 and 14. So disposed, these coils, when energized with an electric current, exert a force on the rotor assembly through their interactions with respective fringing fields 18 and 19. Said force may be positive or negative according to the energizing current polarity. Due to the complexity of the fringing fields, the detailed interactions between said fields and control coils may be derived, without limitation, by empirical measurements, by modeling, or by a combination thereof.

Radial perturbations in rotor position are sensed. Forces generated by the control coils can interact with the rotating fringing fields to damp measured instabilities in radial position.

Overall, control of rotor position comprises, without limitation:

a. Measure the rotor's average geometric location at two measurement positions, one above and the other below the rotor's approximate center of mass, over an integral number of rotations. Due to the weak centration force, these measurements and computations approximate the inertial centers of rotation at the measurement positions.

b. Map the movement of upper and lower inertial centers and calculate their velocities.

c. Calculate control coil currents appropriate to damp these velocities (a variable electronic damper).

d. So long as the velocities of the upper and lower inertial centers are small, the rotor will remain in stable rotation primarily about its inertial axis.

Heat generation imposes other limitations on flywheels constructed according to the prior art. Joule heating loss ($I^2R$, or resistive heating loss) in the stator windings is the primary contributor to heat generation under fast energy charge or discharge conditions. The flywheel vacuum environment can complicate heat transport.

In the instant invention, the stator assembly comprises an enclosure within which are disposed rotor control coils and motor/generator coils. A stator enclosure can provide vacuum isolation and mechanical support for components carried within the stator. The stator enclosure may also contain a suitable dielectric fluid (gas or liquid) that contacts heat-generating stator components to restore convective heat transport to the external environment. The stator assembly is thermally connected to at least one portion of at least one inner surface of the external flywheel enclosure. Using a phase-change material as the dielectric fluid may greatly enhance convective heat transport.

DESCRIPTION

Brief Description of the Figures

FIG. 2: Example of Fringe Field Interaction

DISCUSSION

It is understood that, with regard to this description and the appended claims, reference to any aspect of this invention made in the singular includes the plural and vice versa unless it is expressly stated or unambiguously clear from the context that such is not intended. For instance, a reference to a "sensor" in the singular includes two or more sensors.

As used herein, any term of approximation such as, without limitation, near, about, approximately, substantially, essentially and the like, mean that the word or phrase modified by the term of approximation need not be exactly that which is written but may vary from that written description to some extent. The extent to which the description may vary will depend on how great a change can be instituted and have one of ordinary skill in the art recognize the modified version as still having the properties, characteristics and capabilities of the word or phrase unmodified by the term of approximation. In general, but with the preceding in mind, a numerical value herein that is modified by a word of approximation may vary from the stated value by ±15%, unless expressly stated otherwise.

As used herein, the use of "preferred," "preferably," "more preferred," "presently preferred" and the like refers to preferences as they existed at the time of filing of this patent application.

As used herein, an "electromechanical battery," sometimes referred to in the relevant literature as a "motor-generator," also sometimes referred to as a "flywheel", refers to a device that stores energy in a rapidly rotating rotor assembly and releases that energy as electrical energy as the rotor slows down. Previous manifestations of such batteries are revealed in U.S. Pat. Nos. 5,705,902, 6,566,775, 6,858, 962, 7,679, 247, each of which is incorporated by reference, including drawings, as if fully set forth herein. These and other publications describe in detail the use of a Halbach array that is coupled to a flywheel that is made to rapidly spin and thereby store energy for eventual conversion to electrical as the flywheel spins down. As such, it is not considered necessary to recite herein all of the basic elements of a Halbach array electromechanical battery as such can be readily gleaned from the cited references as well as numerous other patent references and technical articles. The import of the present invention lies in its use of novel technology to stabilize the electromechanical battery's rotating assembly using an extremely low expenditure of energy and stabilizing the rotating assembly substantially about its inertial rotational axis, maximizing energy storage and conversion efficiencies, single charge lifetime and overall operational lifetime of the battery.

Figure 1A:
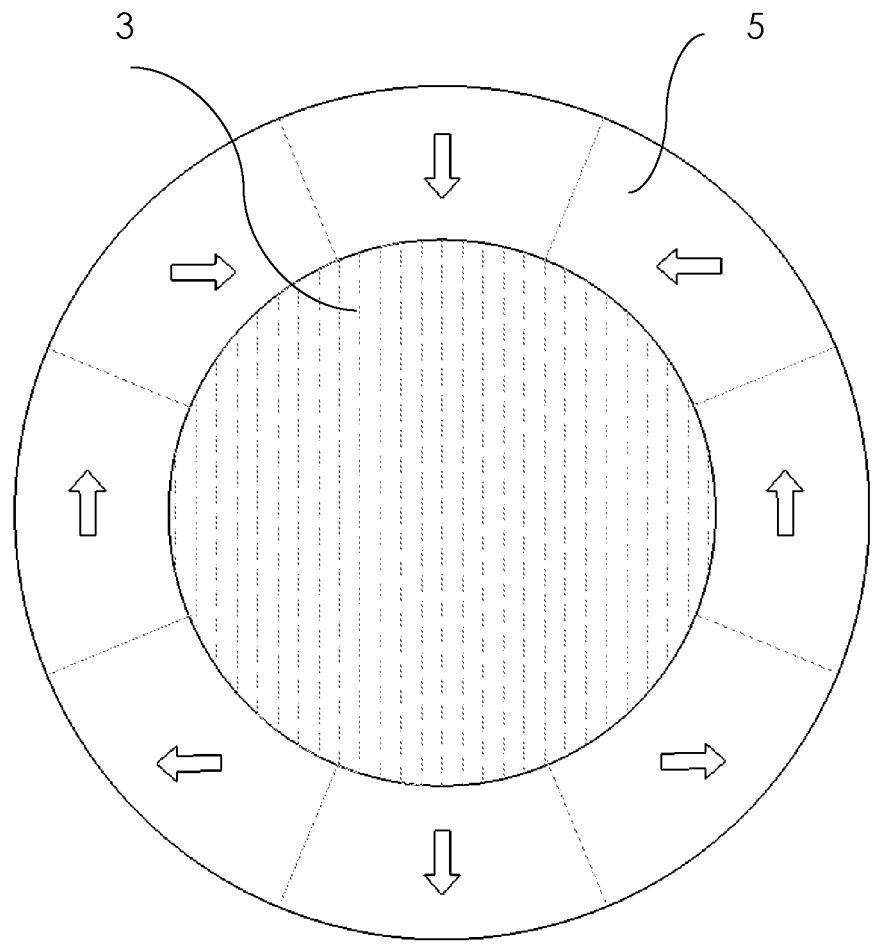
FIG. 1A: Uniform Magnetic Field in the Core of a Single Pole-Pair Halbach Array
Figure 1B:
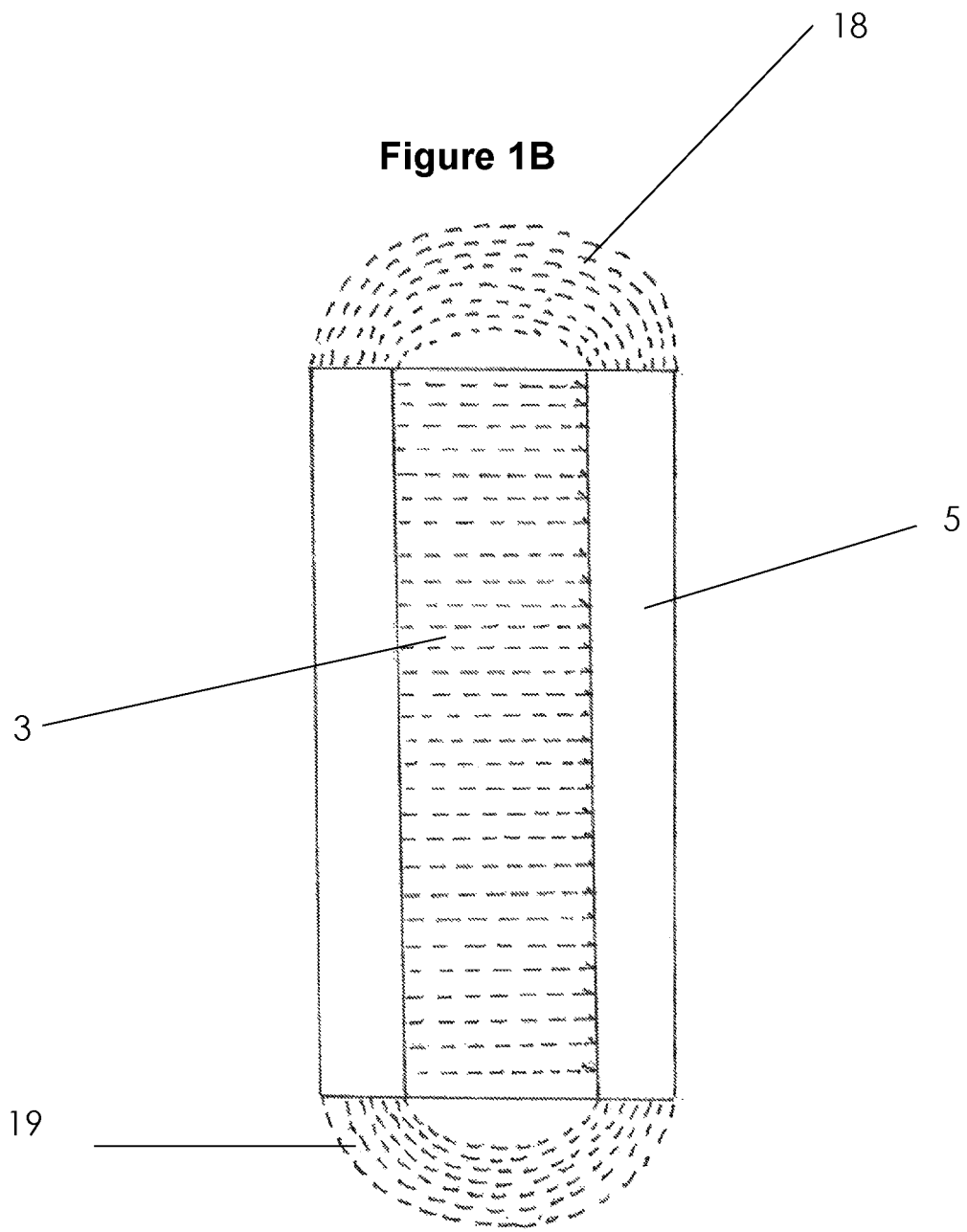
FIG. 1B: Schematic of "Fringing Fields" at Ends of Columnar Single Pole-Pair Halbach Array
Figure 1C:
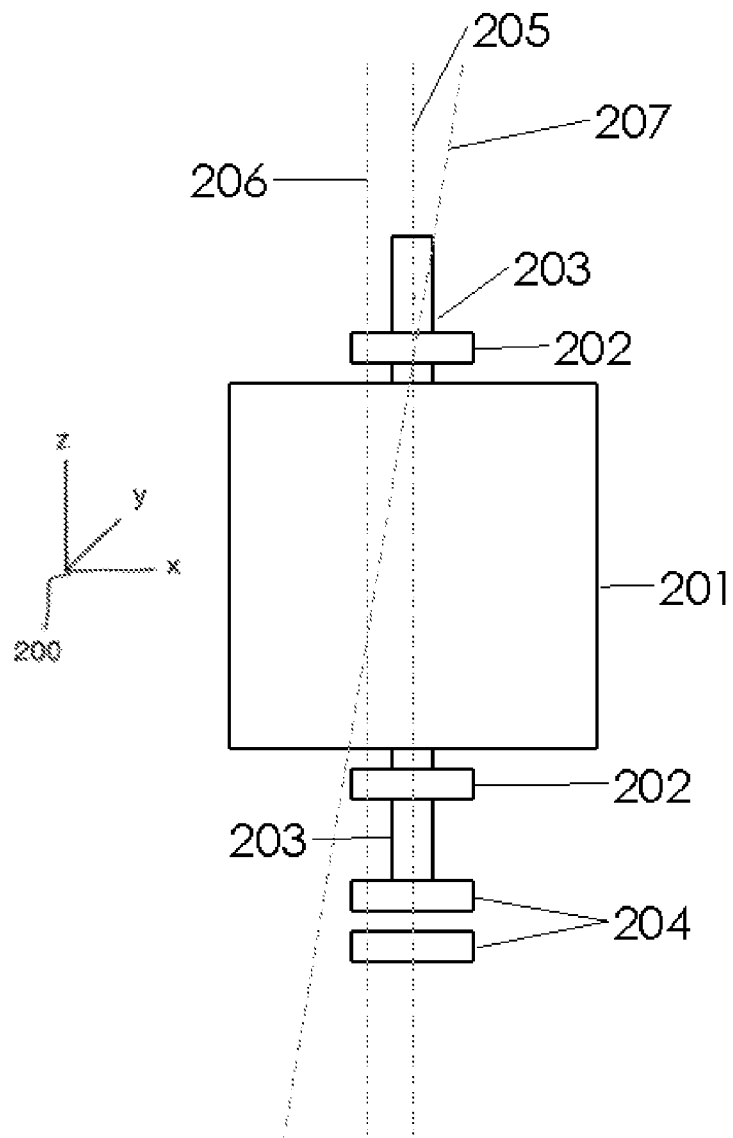
FIG. 1C: Conventional Vertical-Axis Flywheel Suspension, shows a schematic sectional view of a conventional flywheel rotor, its supporting bearings and its geometric and inertial rotational axes. The depicted flywheel and bearings are theoretically perfect and ideal with respect to geometry and mass distribution. Rotor 201 rotates on an axle 203 that is supported radially by bearings 202 and is supported against gravity by thrust bearing assembly 204. The figure depicts a condition of perfect balance and two conditions of imperfect balance. In the ideal case, geometric rotation axis 205 matches the inertial rotation axis, which are colinear and perfectly centered and coaxial with axle 203 and its connected rotor 201, these all being parallel to the Z-axis of 200. In the first depicted imbalance case, a mass distribution inhomogeneity (greater mass on the left rotor half of the sectional view) has caused inertial rotational axis 206 to no longer be colinear with geometric rotational axis 205 (displacement exaggerated for clarity). Both inertial and geometric axes remain parallel because the mass distribution inhomogeneity is purely radial and is symmetric about a horizontal plane bisecting rotor 201 normal to the rotor (with respect to the Z-axis) at exactly its Z-axis midpoint. The second imbalance case depicts rotor 201 having an asymmetric mass distribution such that at the instant depicted in the Figure, the rotor has more mass on its left side and on its upper half, leading to the displaced and tilted inertial axis 207 (displacement again exaggerated for clarity). Geometric axis 205 and inertial axis 207 are neither parallel, nor even necessarily intersecting within the rotor 201.

As used herein, a "rotor assembly" or "rotor" refers to a construct comprising at least the following elements:

a. columnar single pole-pair Halbach array 5, FIG. 1B, disposed vertically along the z-axis of a standard xyz coordinate system. For the purpose of this disclosure such disposition of the Halbach array is referred to as a "vertical columnar array". The Halbach array has a through-hole down the entire center of the array.

b. annular flywheel 8, FIG. 2, coupled to the Halbach array. A flywheel herein has the generally accepted definition, that is, a rotating disk, cylinder of wheel wherein mechanical energy is stored in the rotating mass. For the purposes of this invention, the mass constituting a flywheel may be coupled directly to the Halbach array or the main mass of the flywheel may be displaced outward from the axis of rotation of the flywheel by one or more spacers in order to increase energy stored in the flywheel. A 'spacer' refers to a relatively light weight, compared to the mass of the flywheel, radial member that connects the mass of the flywheel to the Halbach array. A spacer may be one of a plurality of spokes, rods or bars that connect the Halbach array to the flywheel mass. In the alternative, a spacer may comprise a solid ring of relatively light weight material where the inner radius of the ring that allows that surface of the ring to be contiguous with and coupled to the outer edge of the Halbach array and the outer radius of the ring to be contiguous with and coupled to the flywheel mass;

c. tubular stator 10 FIG. 2, is disposed in the through-hole of the Halbach array 5. Stator 10 does not contact the inner wall of the Halbach array; rather, the two ends of the stator are coupled to the top and bottom surfaces of a framework or housing that surrounds the battery as such is described in the cited extant literature. Stator comprises windings 11, FIG. 2, which may comprise one phase, two phase, three phase or higher windings as such are commonly known and referred to in the art. Presently preferred is a three-phase winding.

As used herein, a "Halbach array" refers to a specialized arrangement of permanent magnets as known and understood in the art wherein the magnets augment the magnetic field inside the through-hole of the arrangement while essentially cancelling the magnetic field on the exterior. A top view of a columnar Halbach array is shown in FIG. 1A. In brief, the arrows on the magnets depict the direction of the magnetic field, the arrow head designating north and the tail of the arrow designating south for each participating magnet. For the purposes of this invention, the array is set up to bias the magnetic field into the core through-hole of the array and to essentially eliminate any field outside the columnar array. The magnetic field in the through-hole, indicated by the dashed lines in FIGS. 1A and 1B, is completely directional as indicated in the figures. Of particular note is the fact that the magnetic field within the through-hole of the array is unidirectional and uniform. The uniformity can be fine-tuned by increasing the number of permanent magnets used to create the columnar array and virtually any number of magnets may be used and such columnar Halbach arrays are within the scope of this invention but 12 permanent magnets are presently preferred. While the magnetic field in the through-hole of the columnar Halbach array is uniform, the magnetic field at each end of the array is nonuniform, the magnetic field there exhibiting both radial and longitudinal (or "vertical" when the Halbach array is vertically situated as is the case in the present invention) components, FIG. 1B. These end portions of the Halbach array magnetic field are hereafter referred to as "fringe fields".

Key to this aspect of the invention are two fixed coils, one being located at or near one end of the Halbach column and the other being located at or near the other end of the Halbach column. The coils are disposed so as to be capable of interacting with the two fringe fields of the Halbach array. Thus, the coils may be located anywhere in the through-hole so long as the aforesaid interaction is possible. It is presently preferred, however, that the two coils be disposed inside and at either end of stator 10 such that first coil 12, shown in FIG. 2, is disposed adjacent to top edge 15 of Halbach array 5 and second coil 14 is disposed adjacent to bottom edge 7 of Halbach array 5 (FIG. 2). As can be seen, the coils are at least partially within top fringe field 18 and bottom fringe field 19 of Halbach array 5.

In addition to the rotor and stator elements 4, 10, respectively, an electromechanical battery of this invention includes a sensor, the function of which is to detect changes in the radial position of the rotor assembly when the rotor assembly is levitated. The sensor would, of course, be capable of detecting the radial position of the rotor assembly when it is not levitated, but such is of little consequence to the instant invention. In addition to detecting the position of the rotor assembly when levitated, the sensor is capable of detecting changes in the position of the rotor assembly when it is levitated and rotating. In fact, it is this last function of the sensor that is, at present, of most importance to this aspect of the invention. In electromechanical batteries, the flywheel is often spinning extremely rapidly. Thus, inherent resonance frequencies of the various parts of the battery when spinning and the high speed at which the flywheel is rotating can result in negative effects on the battery such as, without limitation, fatigue and construction material failure. This aspect of the present invention minimizes and potentially eliminates such adverse events.

Once the sensor has detected changes in the radial position of the rotor assembly, it transmits that information to a controller with which it is in communication and the controller, in turn, directs a current through the coils that are at least partially within the fringe magnetic fields thereby interacting with those fields and generating reaction forces on the rotor assembly.

Figure 3:
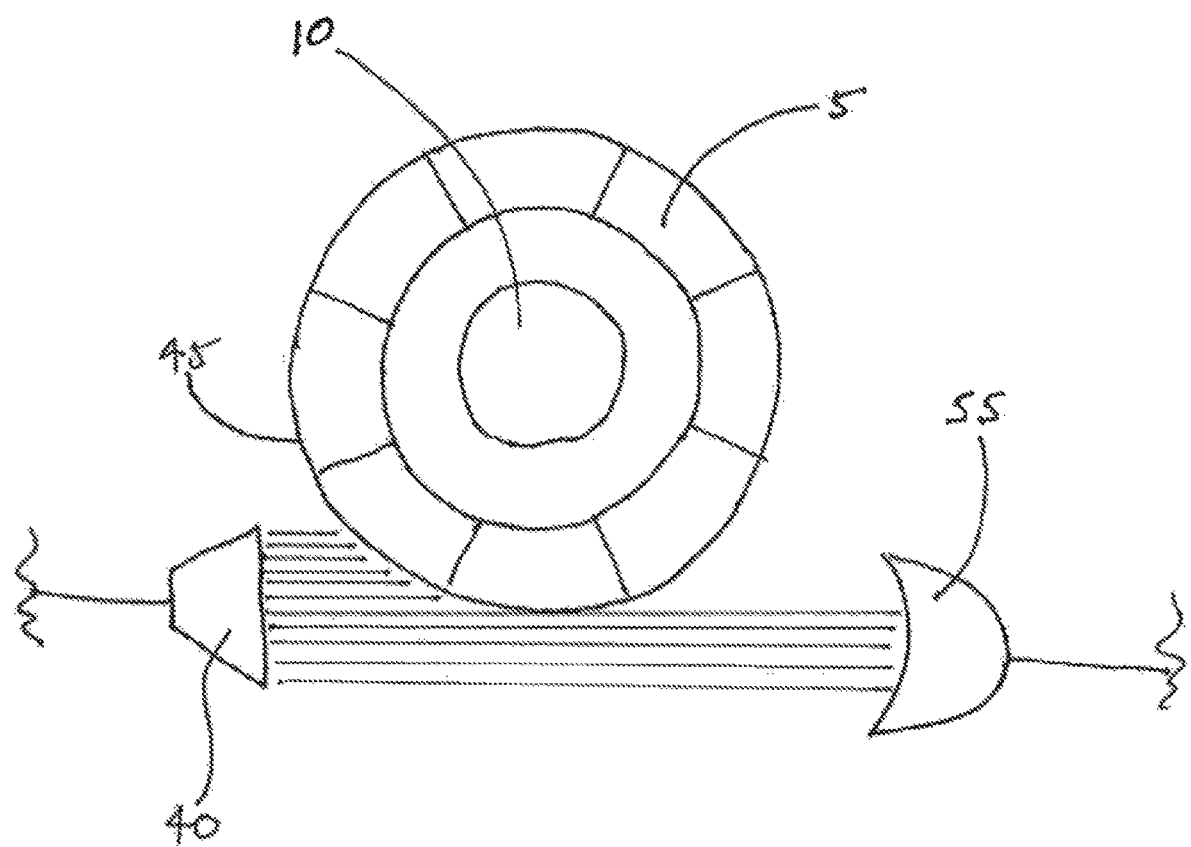
FIG. 3: Example of Optical Occlusion Radial Position Measurement

While virtually any manner of sensor can be used for the above purpose and any and all such sensors are within the scope of this invention, it is presently preferred that the sensor comprises a light source and change in light intensity detector. This is shown in FIG. 3, which is a top down view of Halbach array 5. Light source 40 is directed toward vertical edge 45 of Halbach array 5 in such a manner that a portion of the light is impeded by Halbach array 5 and a portion of the light passes by vertical edge 45 and impinges on detector 55. If Halbach array 5 is spinning out of its preferred axial alignment, the amount of light that detector 55 sees will vary. The change in the amount of light seen by detector 55 is relayed to a controller (not shown), which then performs its function as set forth above. FIG. 3 shows a light source being directed at the body of Halbach array 5 but the sensor/controller pair will work equally well if any edge of the flywheel or other portions of the rotor assembly are used and such are obviously within the scope of this invention. Any light source may be used but it is presently preferred that the light source be an LED, which is inexpensive, has a long operational lifetime and generates minimal heat.

Figure 1D:
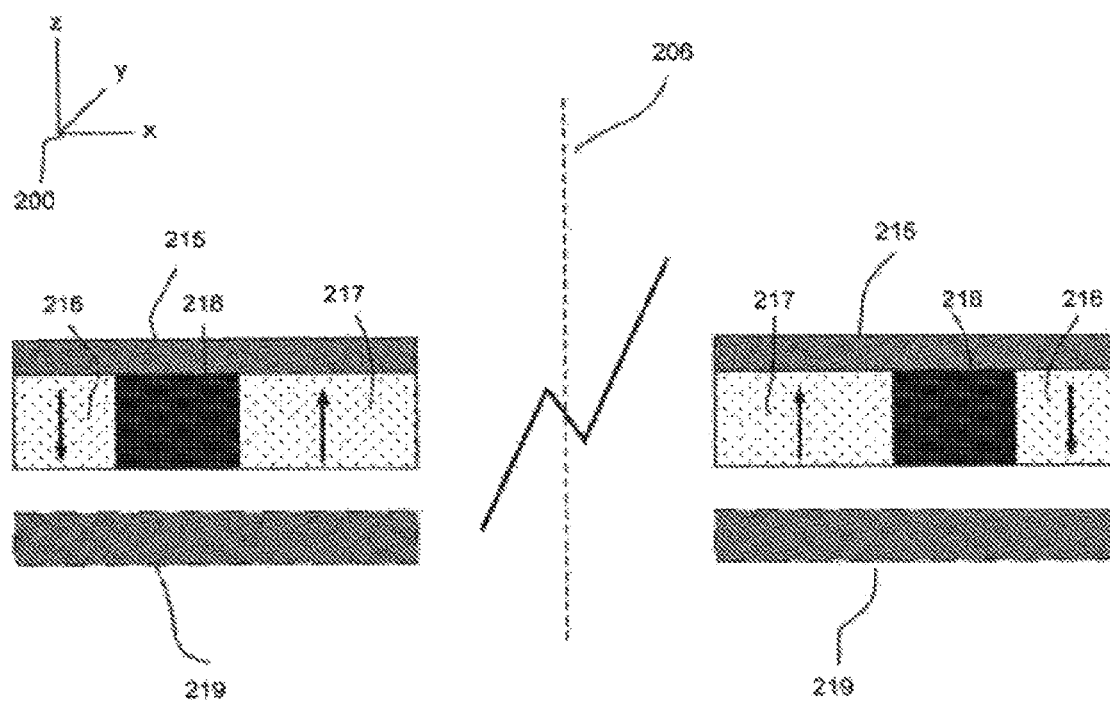
FIG. 1D: Example of an Attractive Levitator Assembly, This Figure schematically depicts a sectional view of one example of a levitator magnet assembly comprised of inner ring magnet 217, outer ring magnet 216, electromagnetic control coil 218, and ferromagnetic housing 215, the assembly being positioned parallel to the XY plane of coordinate system 200 and positioned relative to rotor inertial axis 206. Arrows indicate magnetic polarity of ring magnets 216 and 217. A magnetic rotor component that is controllably attracted by said levitator magnet assembly so as to levitate the attracted rotor (not shown) is depicted. The assembly of enclosure, magnets, and control coil is fixed to a stationary frame (not shown) and attracts magnetic component 219, which is mounted on the rotor assembly (not shown).

A further aspect of this invention relates to fine-tuning the levitation of the rotor assembly. An added benefit of the novel mechanism for doing so is a passive positive effect on centration of the rotor assembly on its longitudinal (vertical) axis of rotation. This aspect of the invention uses at least two assemblies of permanent magnets. While it will be evident from the discussion that follows how the technique discussed would apply when using more than two assemblies of magnets, this description will be directed solely to the presently preferred embodiment which is the use of just two assemblies of magnets. While the following discussion refers to an embodiment in which one magnet of each assembly of levitation magnets is fixed to the rotor assembly, it discloses and applies equally to the levitation magnet assembly of FIG. 1D, which depicts one of the at least one assembly of levitation magnet assemblies configured such that no magnets are fixed to the rotor.

Figure 4:
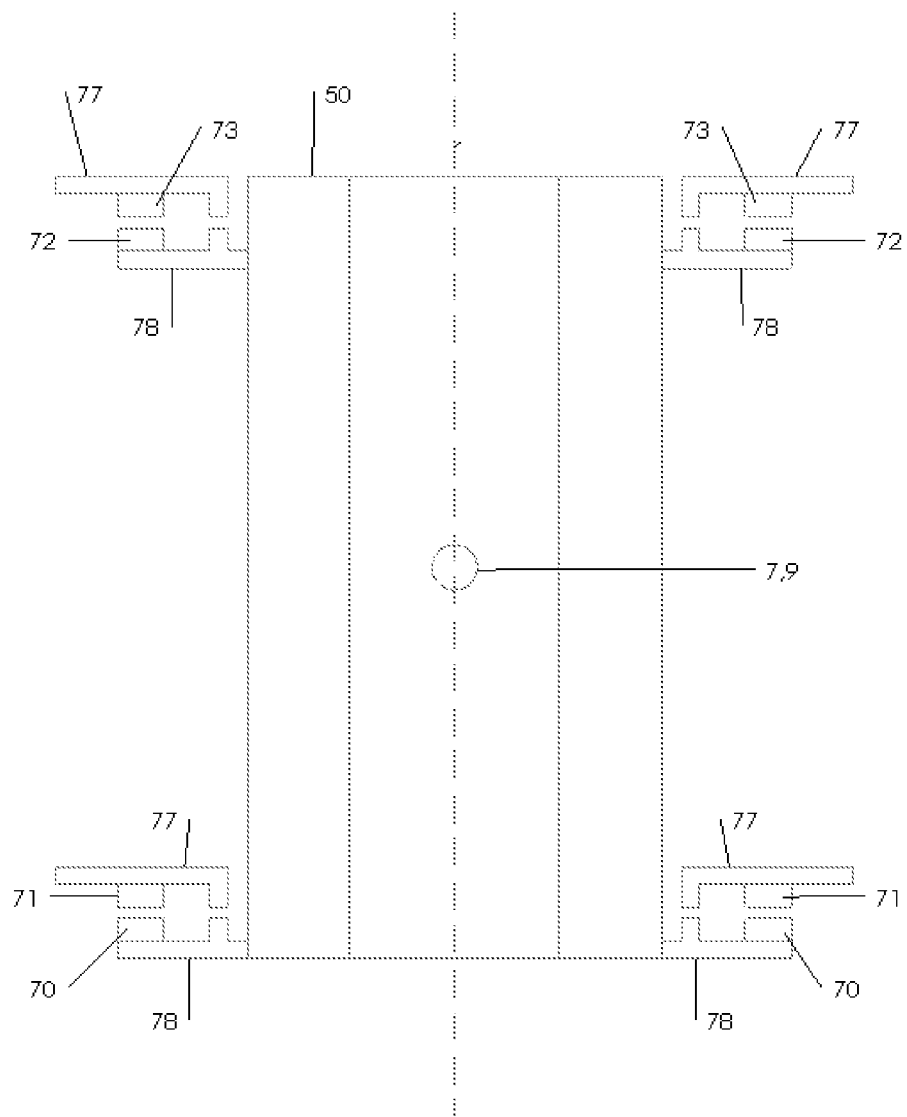
FIG. 4: Example of a Double-Lift Configuration

In FIG. 4, the polarity of magnets 70, 71, 72, and 73 are as shown using the conventional arrow depiction of polarity. As can be seen, magnetic pair 70 and 71 and magnetic pair 72 and 73 are both in attractive mode. The pairs of magnets are both orthogonal to the longitudinal axis, that is, the approximate inertial axis of rotation 77 of rotor assembly 50. With attention to achieving torque balance around the CG of the rotor's radial axis, these could be located anywhere between the ends of rotor assembly 50 but it is presently preferred that they be located equidistantly from the center of gravity (CG) 79 of rotor assembly 50, one pair being above the CG and one pair being below the CG. The magnetic force generated by the two pairs of permanent magnets in attractive mode is selected so as to be sufficient to levitate rotor assembly 50 with its spoke/flywheel.

The use of magnets to offset the gravimetric weight of rotor assemblies/flywheels has long been known in the art. Commonly used configurations for vertical-axis flywheels, however, differ from that of this invention in that, in the art, either repulsive arrays are preferred, or else an attractive array is used near the top of the rotor, while a secondary array at the bottom is either absent entirely, or configured to interact in repulsion. The problem with this is that, when in repulsive mode, magnets are radially divergent; that is, they push each other away and to one side or another. With regard to an electromechanical battery, this inherent tendency to diverge necessitates additional methods to achieve and maintain rotor assembly stability around its axis of rotation. Generally, rotor assembly stability imposes tight constraints on rotor mass balance to limit imbalance forces. This, then, requires more expensive rotor manufacturing procedures. Even then, it is well-known that rotor mass distribution often changes during operation. In the short term, rotor mass distribution may change as the rotor expands nonuniformly during spin-up. Over the long term, rotor mass distribution may change as rotor materials creep due to prolonged exposure to radial and circumferential stresses at high rotation speeds. In addition, rotor mass distribution may change suddenly as the result of limited material failure under rotational stress. In contrast to prior art, the instant invention can overcome these limitations.

With reference to FIG. 4, magnet 72 and magnet 73 are set to be in attractive mode, as are magnets 70 and 71. This configuration minimizes divergent forces, at the perceived cost of having to be actively modulated to achieve vertical stability. Flipping the direction of the poles between the upper pair and the lower pair, while not necessary for function of the invention, can make the net magnetic fields introduced by the levitation magnetic sets effectively balance each other out when considered from more remote distances.

By employing two levitators both of which act in attractive mode, each levitator exerts a passive radial centering force, referred to herein as "centration" on the rotor and thus requires no compensation for radial divergence effects inherent in repulsive levitators. The weak radial restoring force permits large radial clearances between the rotor assembly and adjacent stationary structure, which allows rotation approximating that which would result from a rotor spinning purely according to its inertial mass distribution without radial constraint. This enhanced clearance in turn accommodates changes in the rotor assembly/flywheel mass distribution due to spin-up/spin-down nonuniform strains, material aging and local microstructural failures. In addition, the two pairs of levitation magnets in attractive mode present essentially identical characteristics with respect to development of hardware production and assembly and can simplify control software design. These and other advantages of the "double-lift" design with both pairs of levitating magnets being in attractive mode will become clear to those skilled in the art based on the discussion herein and knowledge of the shortcomings of alternative suspension systems.

It is also an aspect of this invention that magnet supporting elements 77 are L-shaped with the leg of the L facing downward toward and aligned with a projection upward from magnet supporting elements 78. While magnet supporting elements 77 and 78 may be constructed of any material of sufficient strength to perform their support function, it is presently preferred that magnet supporting elements 77 and 78 be constructed of a high magnetic permeability material. An example, without limitation, of such a material would be a ferromagnetic material such as steel. This is equally applicable to elements 215 and 219 of FIG. 1D. If steel elements are used, the "ring" formed by the magnets themselves and the magnet supporting elements including the L-shaped portion of element 77 and the magnet supporting elements including the L-shaped portion of element 77 and the upward facing portion of element 78 create a pathway for continuous circulation of magnetic flux, which serves to strengthen the magnetic field in the vicinity of the magnets and thereby enhance the attractive force between the magnets to further facilitate levitation.

Figure 5:
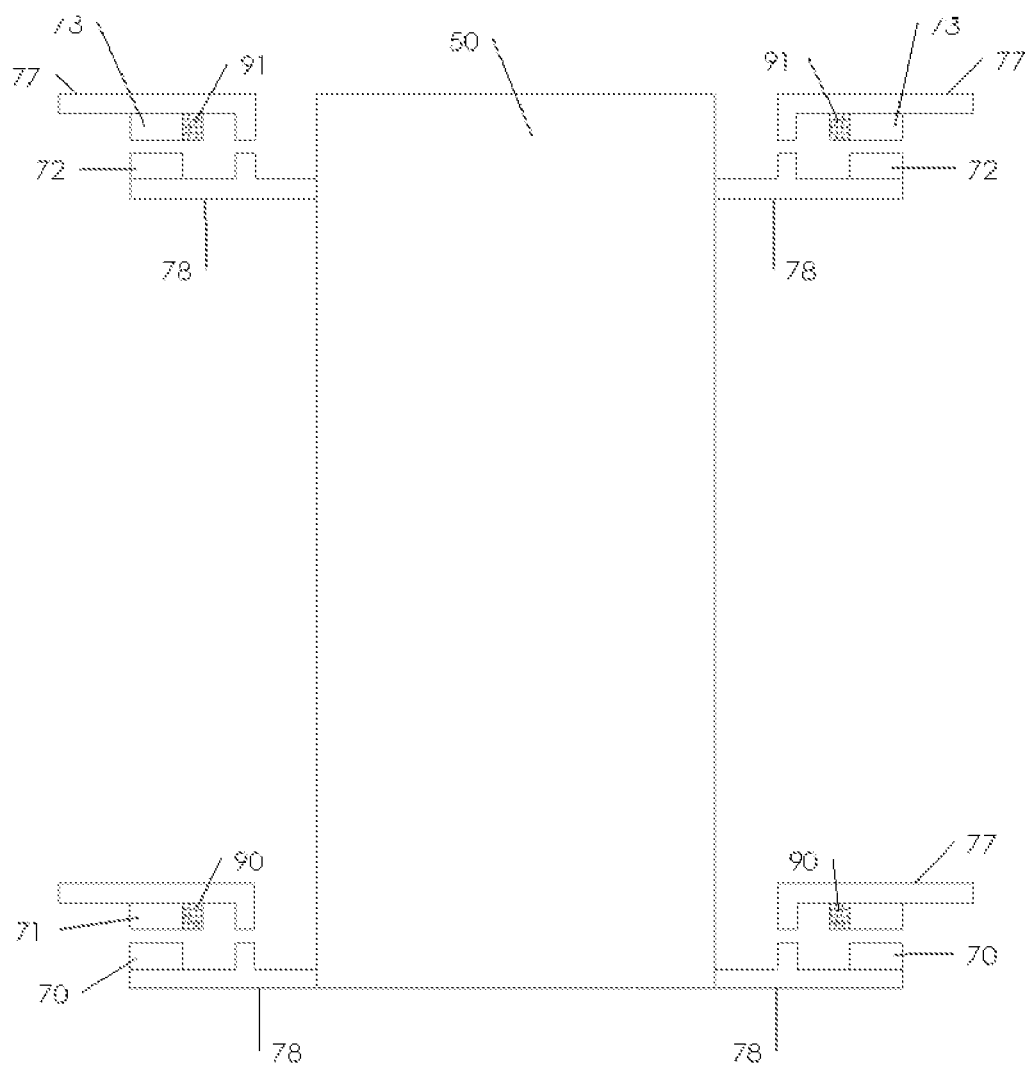
FIG. 5: Example of a Double-Lift Configuration with Control Coils to Modulate Lift

To deliver the above advantages, the double-lift design of the instant invention requires active control of the vertical position of the rotor assembly/flywheel of this invention. This is accomplished by the inclusion of control coils 90 and 91, shown in FIG. 5, and by control coil 218 in FIG. 1D. In FIG. 5, the control coils are situated adjacent to stationary magnets 71 and 73. A controller (not shown) is in communication with a sensor, which detects changes in the vertical position of the levitated rotor assembly and relays that position data to the controller, which then directs a current through control coils 90 and 91 to alter the magnetic field intensity between magnets 70 and 71 and magnets 72 and 73 to affect the vertical position of rotor assembly 50. Many control algorithms are suitable, for example, a PID controller.

Figure 6:
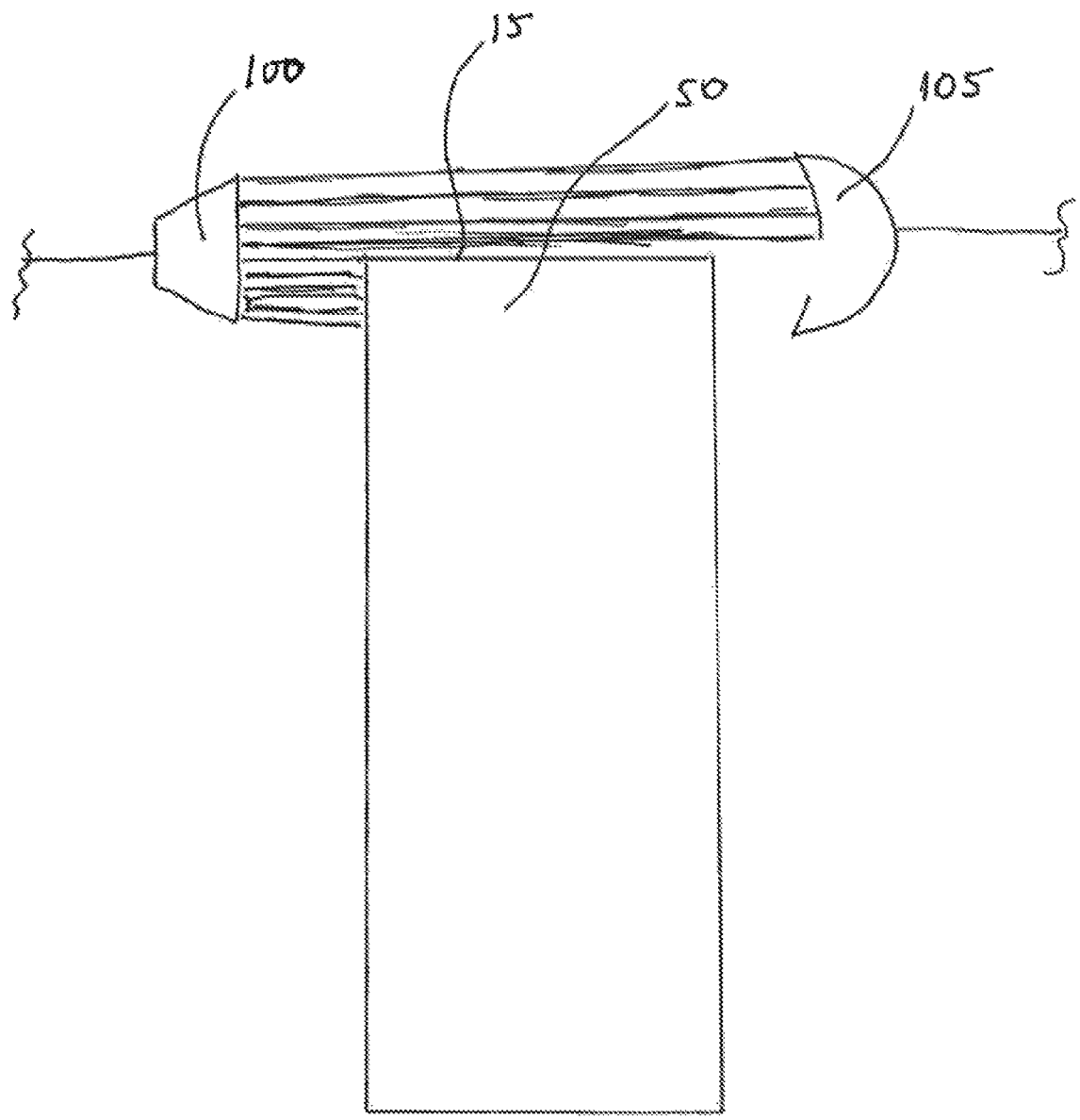
FIG. 6: Example of Optical Occlusion Vertical Position Measurement

The sensor for detecting changes in vertical position of rotor assembly 50 is similar to the sensor for detecting radial divergence of rotor assembly 50. Again, any type of sensor that will achieve the result described below can be used and is within the scope of this invention. It is presently preferred, however, that the sensor comprises a light source and change in light intensity detector. This is shown in FIG. 6. Light source 100 is directed toward the edge of top surface 15 or rotor assembly 50 in such a manner that a portion of the light is impeded by rotor assembly 50 and a portion of the light passes by top surface 15 and impinges on detector 105, which is located on the other side of rotor assembly 50 from light source 100. If rotor assembly 50 is moving upward or downward from its current location, the amount of light that detector 105 sees will vary. Changes in the amount of light detected by detector 105 are relayed to a controller, which then performs its function as set forth above. While FIG. 6 shows the light source being directed across the top surface of rotor assembly 50, it is equally permissible and is within the scope of this invention for the light source to be trained across the bottom surface of levitated rotor assembly 50. As before, any light source may be used but it is presently preferred that the light source be an LED.

It should be noted that, while the above double-lift mechanism for levitating a rotor assembly/flywheel is described as an addition to the earlier described device comprising means for controlling radial displacement of the rotor assembly, it is possible and is an aspect of this invention that the double-lift mechanism may be used without radial displacement control, the result being a device with active vertical placement control only.

Figure 7:
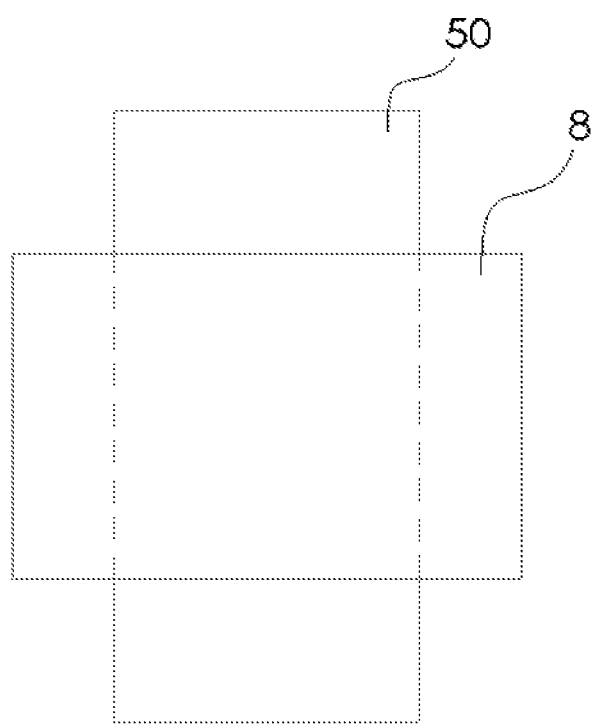
FIG. 7: Flywheel Mass Contiguous to the Halbach Array

The flywheel of an electromechanical battery of this invention may be appended to the rotor assembly in at least two distinct ways. The flywheel mass may be contiguous with and directly connected to the Halbach array. This is shown in FIG. 7 where, as stated, flywheel 8 is contiguous with and joined directly to Halbach array 5. In the alternative, the mass of flywheel 8 may comprise a separate annular ring some distance radially from rotor assembly 50 and Halbach array 5. This is shown in FIG. 2 where flywheel 8 is separated from the Halbach core and is attached to the rotor assembly 50 using spacing elements 110. The spacing elements may simply be spokes such as those found on any manner of wheel connected to a hub, such as an automobile or bicycle tire. The spacing element, on the other hand, may be a solid construct in which an inner radius of the spacing element is completely contiguous with the surface of a rotor assembly and an outer radius of the spacing element is completely contiguous with the inner surface of the flywheel mass. Of course, other spacing elements for connecting the rotor assembly to the flywheel will be evident to those skilled in the art based on the disclosures herein and all such alternative spacing elements are within the scope of this invention.

Another aspect of this invention is a device for attenuating detrimental magnetic field interactions within an electromechanical battery. Electromechanical batteries such as that of this invention use permanent and electromagnets to generate powerful magnetic fields that may interfere with one another. For example, the magnetic fields used for the motor/generator of a flywheel-based electromechanical battery may interfere with the magnetic fields generated for systems such as those described above for vertical positioning. To attenuate these interferences, an element made of magnetically permeable material may be interposed between a magnetic field and those locations from which it is desired that a magnetic field be excluded or, at least, its intensity at the location be diminished. The permeable element provides a preferential path for magnetic flux thereby diminishing residual magnetic force that might detrimentally affect another element of the overall electromechanical battery system. Any type of highly magnetically permeable material may be used but it is presently preferred that the material be ferromagnetic and have a magnetic permeability of at least 2000. This would, it is anticipated, enhance the stable operation of all elements of the system. Such an element is shown in FIG. 8.

Figure 8:
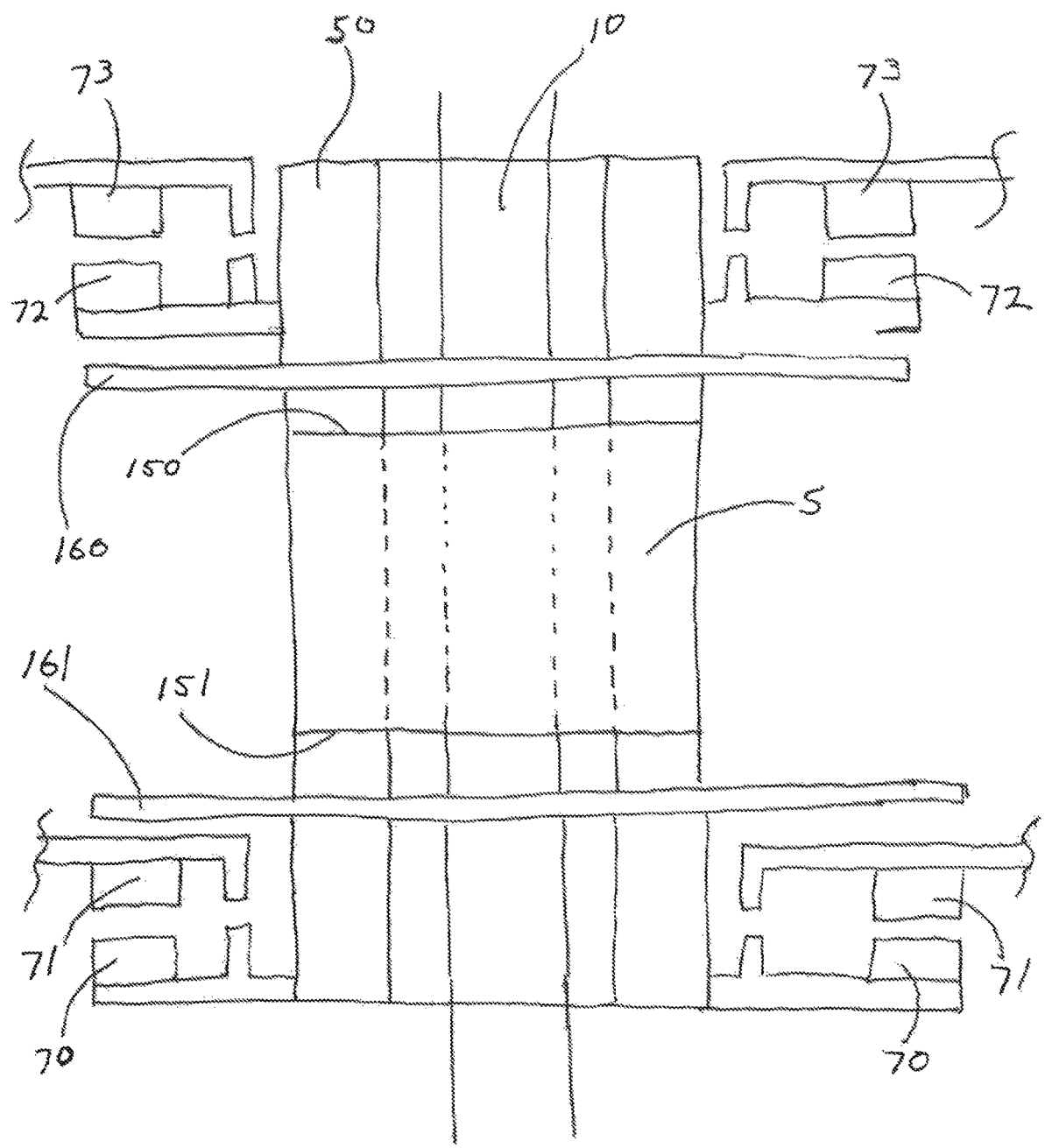
FIG. 8: Example of Magnetic Subsystem Shielding

FIG. 8 shows rotor assembly 50 with double-lift permanent magnet pairs 70 and 71 and 72 and 73. Placed between the top surface 150 of Halbach array 5 and double lift magnet pair 72 and 73 is annular element 160. Likewise, annular element 161 is placed between bottom surface 151 of Halbach array 5 and double lift magnet pair 70 and 71. The elements are annular so as to allow stator 10 to protrude from both ends of rotor assembly 50 and to be attached to a top and a bottom surface of a housing (not shown) containing the entire electromechanical battery. As shown in FIG. 8, annular elements 160 and 161 isolate the magnetic fields created by permanent magnets 70, 71, 72, and 73 from fringe fields 18 and 19 created by the Halbach array (not shown but see FIG. 2). This then mitigates interferences between the magnetic fields and any attendant negative effect on the stability of rotor assembly 50.

PRIOR ART CITED

U.S. Pat. No. 7,876,010
U.S. Pat. No. 7,679,247
U.S. Pat. No. 6,858,962
U.S. Pat. No. 6,566,775
U.S. Pat. No. 5,705,902
Merritt, Bernard T, RF Post, Gary R Dreifeurst, and DA Bender. "Halbach Array Motor/Generators-A Novel Generalized Electric Machine." *Halbach Festschrift Symposium*, Feb. 3, 1995.
Shafai, Beale, S Beale, P LaRocca, and E Cusson. "Magnetic Bearing Control Systems and Adaptive Forced Balancing." *Control Systems*, IEEE 14, no. 2 (1994): 4-13.

What is claimed:
1. An electromechanical battery comprising:
a rotor assembly comprising:
   a. a vertical columnar single pole-pair Halbach array of permanent magnets that define a central through-hole, the array having an upper end, a lower and, and essentially planar top and bottom surfaces, wherein the planar top and bottom surfaces are perpendicular to a longitudinal axis of the columnar array, wherein,
the Halbach array has a substantially uniform unidirectional magnetic field in the central through-hole and nonuniform fringe magnetic fields with radial and vertical components at its top and bottom surfaces;
   b. an annular flywheel coupled to the Halbach array;
   c. a stator disposed within the through-hole of the Halbach array and substantially centered on the longitudinal axis of the array;
   d. windings disposed within the stator; and
   e. a coil at the upper end and a coil at the lower end of the Halbach array, wherein the coils interact with the fringe magnetic fields;

a sensor that detects changes in radial position of the rotor assembly when the rotor assembly is levitated; and
a radial controller in communication with the sensor wherein, upon receiving radial position data from the sensor, the radial controller directs current through the coils to affect the radial position of the rotor assembly.

2. The electromechanical battery of claim 1, wherein the sensor comprises:
a light source that directs a beam of light at a longitudinal edge of the rotor assembly such that a portion of the beam is blocked by the rotor assembly; and
a detector positioned on the opposite side of the rotor assembly from the light source wherein the detector senses changes in the quantity of light that passes by the longitudinal edge of the rotor assembly due to changes in the radial position of the rotor assembly and transmits that information to the controller.

3. The electromechanical battery of claim 1, comprising:
at least two assemblies of permanent magnets, each assembly comprising one or more magnets, each assembly being fixedly coupled to a framework that surrounds the rotor assembly, the one or more magnets of each assembly being disposed to exert levitating force on the rotor assembly.

4. The electromechanical battery of claim 3, wherein:
each assembly of magnets extends in a plane that is orthogonal to the longitudinal axis of the rotor assembly; and
one assembly of magnets is disposed above the center of gravity of the rotor assembly and the other assembly of magnets is disposed below the center of gravity of the rotor assembly, wherein:
the assemblies of permanent magnets generate sufficient magnetic force to levitate the rotor assembly against gravity while, in addition, passively affecting the centration of the rotor assembly.

5. The electromechanical battery of claim 4 wherein the assemblies of magnets are disposed equidistantly above and below the center of gravity of the rotor assembly.

6. The electromechanical battery of claim 5, wherein two assemblies of magnets are used.

7. The electromechanical battery of claim 3, comprising:
a sensor that detects changes in the vertical position of the rotor assembly when the rotor assembly is levitated; and
a vertical controller in communication with the sensor wherein, upon receiving vertical position data from the sensor, the vertical controller directs current through the control coils to affect the vertical position of the rotor assembly.

8. The electromechanical battery of claim 1, wherein the battery is disposed in an air-tight housing.

9. The electromechanical battery of claim 1, further comprising a permeable component to isolate the fringe magnetic fields from interaction with other magnetic fields.

10. An electromechanical battery comprising:
a rotor assembly comprising:
a. a vertical columnar single pole-pair Halbach array of permanent magnets that define a central through-hole, the array having an upper end, a lower and, and essentially planar top and bottom surfaces, wherein the planar top and bottom surfaces are perpendicular to a longitudinal axis of the columnar array, wherein, the Halbach array has a substantially uniform unidirectional magnetic field in the central through-hole and nonuniform fringe magnetic fields with radial and vertical components at its top and bottom surfaces;
b. an annular flywheel coupled to the Halbach array;
c. a stator disposed within the through-hole of the Halbach array and substantially centered on the longitudinal axis of the array; and
d. windings disposed within the stator;
at least two assemblies of permanent magnets, each assembly comprising one or more magnets, each assembly being fixedly coupled to a framework that surrounds the rotor assembly, the one or more magnets of each assembly being disposed to exert levitating force on the rotor assembly via levitation magnetic fields;
each assembly of magnets extending in a plane that is orthogonal to the longitudinal axis of the rotor assembly; and
one assembly of magnets being disposed above the center of gravity of the rotor assembly and the other assembly of magnets being disposed below the center of gravity of the rotor assembly, wherein:
the assemblies of permanent magnets generate sufficient magnetic force to levitate the rotor assembly while, in addition, passively affecting the centration of the rotor assembly.

11. The electromechanical battery of claim 10, wherein the battery is disposed in an air-tight housing.

12. The electromechanical battery of claim 11, wherein a vacuum is created in the air-tight housing.

13. The electromechanical battery of claim 12, wherein heat generated within stator windings is transported to the air-tight housing.

14. The electromechanical battery of claim 10, wherein:
the rotor assembly comprises at least one material of construction selected from: carbon fiber, glass fiber, basalt fiber, aramid fiber, silica fiber, and wherein:
said material of construction is disposed in the form of a composite material.

15. The electromechanical battery of claim 10, further comprising a permeable component to isolate the levitation magnetic fields from interaction with the nonuniform magnetic field and the fringe magnetic fields.

16. An electromechanical battery comprising:
a rotor assembly comprising:
a. a vertical columnar single pole-pair Halbach array of permanent magnets that define a central through-hole, the array having an upper end, a lower and, and essentially planar top and bottom surfaces, wherein the planar top and bottom surfaces are perpendicular to a longitudinal axis of the columnar array, wherein, the Halbach array has a substantially uniform unidirectional magnetic field in the central through-hole and nonuniform fringe magnetic fields with radial and vertical components at its top and bottom surfaces;
b. an annular flywheel coupled to the Halbach array;
c. a stator disposed within the through-hole of the Halbach array and substantially centered on the longitudinal axis of the array;
d. windings disposed within the stator; and
the electromagnetic battery further comprising first and second attractive levitator magnet assemblies, wherein one of the attractive levitator magnet assemblies is disposed above the center of gravity of the rotor assembly and the other attractive levitator magnet assembly is disposed below the center of gravity of the rotor assembly.

17. An electromechanical battery as in claim 16 wherein:
the first and second attractive levitator magnet assemblies generate sufficient magnetic force to levitate the rotor assembly against gravity while, in addition, passively affecting the centration of the rotor assembly.

18. An electromechanical battery as in claim 16 further comprising a first control coil located above the center of gravity of the rotor assembly and a second control coil located below the center of gravity of the rotor assembly, to control a radial position of the rotor assembly.

* * * * *